Oct. 12, 1943.  E. W. STEPHENS  2,331,813
PORTABLE CONVEYER
Filed Oct. 10, 1941
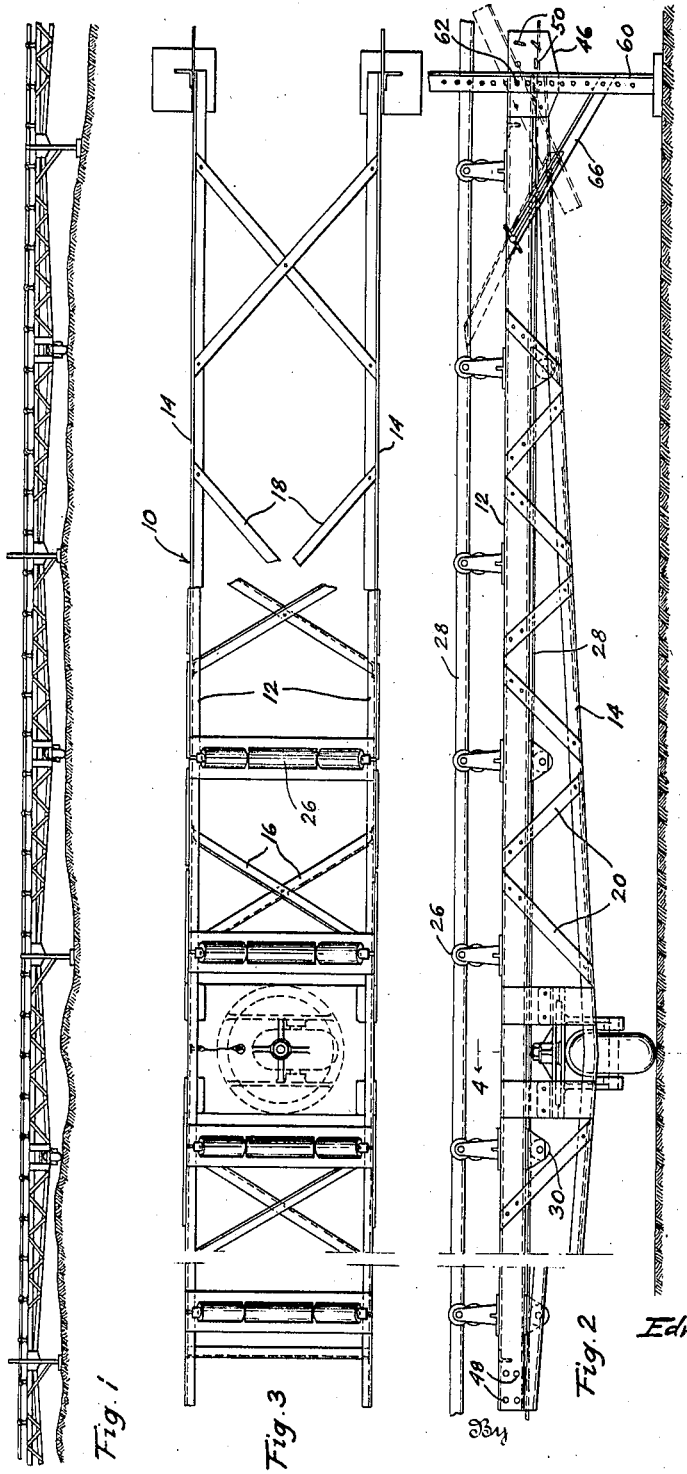
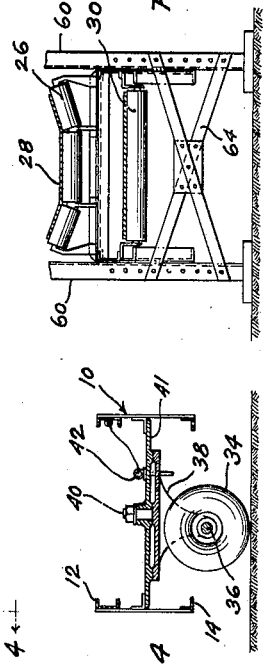
Inventor
Edward W. Stephens
Attorney Patented Oct. 12, 1943

2,331,813

UNITED STATES PATENT OFFICE 2,331,813

PORTABLE CONVEYER

Edward W. Stephens, Akron, Ohio, assignor to Wingfoot Corporation, Akron, Ohio, a corporation of Delaware Application October 10, 1941, Serial No. 414,469

6 Claims. (Cl. 198—233)

This invention relates to conveyer systems, and, more particularly, is concerned with conveyer systems of portable character and adapted to be installed with a minimum of effort and in a relatively short space of time to perform substantially any desired conveying operation, and the invention is concerned with the construction of the individual sections which are assembled together to form the complete conveyer system.

Heretofore, various conveyer systems have been suggested and used and wherein the complete conveyer system is built up from a plurality of individual sections or segments. However, I have found that such prior practices are open to various objections, including initial and maintenance cost, difficulty of transporting the individual conveyer sections, inability to adapt the complete conveyer system to rough terrain, the time factor required to assemble the complete conveyer system, and the difficulty of repositioning the conveyer system or adding to the length thereof.

It is the general object of my invention to avoid and overcome the foregoing and other difficulties of and objections to known conveyer systems by the provision of an improved conveyer system characterized by high portability, low initial and maintenance cost, ease of assembly even over rough terrain, and high strength after assembly.

Another object of my invention is to provide a conveyer system having a plurality of individual conveyer sections including a caster-type pneumatic tire support, adjustable shoring means, and quickly releasable means for securing each section to an adjacent section.

Another object of my invention is to provide a portable conveyer section having adjustable self-contained shoring up means associated therewith.

Another object of my invention is the provision of a portable conveyer section including quickly releasable means for securing the conveyer section to an adjacent conveyer section even though the planes of the conveyer sections are at any one of a wide variety of angles to each other, as for example, over rough terrain.

The foregoing and other objects of my invention are achieved by the provision of a conveyer system including a plurality of sections secured together end to end by quickly releasable means, each conveyer section including a pneumatic tire mounted on a caster-type mounting positioned centrally and at the bottom of each conveyer section, and adjustable shoring means carried by each conveyer section at one end adjacent to the point of connection to the next adjacent section.

Stated more specifically, my invention includes a portable conveyer section comprising an elongated frame of flattened and inverted isosceles triangular shape in side elevation, a plurality of belt supporting rollers positioned transversely of the frame in two different planes thereon, a pneumatic tire, means journaling the tire at the center bottom of the frame for rotation about a horizontal axis, means mounting the tire journaling means for rotation around a vertical axis, means for locking the last-named means against rotation around a vertical axis, a pair of gusset plates secured to one end of the frame and having extending portions adapted to be secured to the next adjacent conveyer section, and a pair of shoring up members adjustably secured to opposite sides of one end of the frame.

For a better understanding of my invention reference should be had to the accompanying drawing wherein:

Fig. 1 is a side elevation, partly broken away, of a conveyer system embodying the principles of my invention;

Fig. 2 is an enlarged side elevation, partly broken away of a typical conveyer section incorporated in the conveyer system;

Fig. 3 is a plan view, partly broken away, of the conveyer section shown in Fig. 2;

Fig. 4 is a transverse cross-sectional view taken substantially on line IV—IV of Fig. 2; and Fig. 5 is an end view of the apparatus shown in Fig. 2.

Referring to the drawing, and specifically considering the construction of one conveyer section, the numeral 10 indicates generally an elongated frame including channel-shaped upper side members 12 and angle-shaped bottom side members 14. The upper side members 12 are secured together by diagonally positioned angles 16 which are welded or riveted in position. Braces 18 positioned diagonally secure the bottom angles 14 together, and diagonally positioned braces 20 connect the upper side members 12 with the lower side members 14. The braces 18 and 20 are welded or riveted in place as will be understood.

From the drawing, it will be evident that the elongated frame thus provided is of an inverted and flattened isosceles triangular shape in side elevation. The elongated frame carries a plurality of rollers 26 adjacent its upper surface which are positioned transversely of the frame and are generally mounted on suitable axes so as to provide a cradle-shaped support for a conveyer belt 28. Rollers 30 are also journaled on the frame 10 at a lower plane, as best seen in Fig. 5, so that a support is provided for the return of the belt 28.

Positioned centrally of the frame 10 and at the bottom thereof is a pneumatic tire 34 which is preferably of the type having a relatively large cross-sectional diameter with respect to its overall diameter to thereby provide considerable resiliency. The pneumatic tire 34 is mounted upon a horizontal axis 36, and is carried by a caster-type mounting bracket 38, which is pivotally connected, as at 40 to the cross plate 41 of the frame 10 for movement about a vertical axis. The mounting bracket 38 is adapted to be removably locked with the plate 41 and the frame 10, as by the provision of a locking pin 42 received in any one of a plurality of holes in the plate 10 so that the bracket 38 can be locked in any desired angular position with respect to the frame 10. Thus, the pneumatic tire 34 can have its axis 36 positioned and locked either transversely of the frame 10 or longitudinally thereof or at other angles to facilitate movement or transporting of the conveyer section.

Means are associated with one end of the frame 10 to facilitate a quickly releasable connection with an adjacent conveyer section. These means conveniently take the form of gusset plates 46 which are riveted, welded, or otherwise secured to the sides of one end of the frame 10 so that portions of the gusset plates extend beyond the ends of the frame 10 and are positioned a sufficient distance apart to receive the end of an adjacent conveyer section. The end of the conveyer section which is adapted to be removably received between the gusset plates is preferably formed with bolt holes 48 through which bolts may be extended into cooperating holes 50 formed in the ends of the gusset plates 46. It will be noted that the holes 50 in the gusset plates may be made elongated, and that preferably one of the holes is made round and the other holes are made in the form of arcuate slots formed on radii thrown from the round hole. In this manner a quickly releasable connection is provided between the ends of adjacent conveyer sections even though the plane of the respective sections may be at any one of a plurality of angles to each other.

Adjustable shoring means are carried by one end of each conveyer section, and in the drawing these means have been illustrated as including a pair of angle members 60 pivotally and adjustably secured to the frame 10, as at 62, and having an X-brace 64 connecting the angle members together transversely for movement as a unit. One or two diagonal braces 66 pivotally secured to the angle member 60 and connected by a slot and lever nut to the frame 10 stabilizes the shoring members in a longitudinal direction. It will be understood that the angular shoring members 60 are adjusted vertically so as to engage the ground and to support the complete conveyer system in a strong and rigid manner when it is assembled together. The construction and arrangement of the shoring member 60 and the pivot 62 therefor is such that the whole shoring means when not in operative position may be swung up to the position shown in dotted lines underneath the end of the frame 10 to facilitate the transporting of each individual conveyer section.

In the use of the apparatus each individual conveyer section can be readily transported by locking the axis 36 of the pneumatic tire 34 so that the axis extends transversely of the frame 10 whereupon a truck or tractor can be secured to one end of the conveyer section and the section can be pulled into the desired field position. Thereupon, the shoring means are swung down into shoring position and the brace 66 is bolted to the vertical shoring member 60 which has been adjusted to the desired vertical height. Additional conveyer sections can thereafter be moved into longitudinal alignment with the first conveyer section and quickly secured in position by bolts extended through the holes 48 and 50 and tightened in place when the angular relation of the conveyer sections is as desired. Thereafter, the conveyer belt 28 is threaded over the rollers 26 and 30 and suitable driving means for the conveyer (not shown) are incorporated somewhere in the system to provide a suitable drive.

It is sometimes desirable to change the lateral position of the complete conveyer system so as to cover new loading or unloading areas. With the apparatus of my invention this may often be done without taking the sections apart and is accomplished by positioning the axes 36 of the pneumatic tires 34 longitudinally of the conveyer system and attaching tractors to the side of the system and towing it laterally to the new position. During this operation the shoring means 60 are moved out of the way so as to permit the lateral movement of the complete conveyer system.

From the foregoing it will be recognized that the objects of my invention have been achieved by the provision of an improved, flexible, conveyer system which can be readily assembled to perform substantially any desired conveying operation. The individual conveyer sections are completely portable, and are adapted to be quickly connected end to end over substantially any terrain.

While in accordance with the patent statutes I have specifically illustrated and described one embodiment of my invention, it should be understood that I am not to be limited thereto or thereby, but that the scope of my invention is defined in the appended claims.

I claim:

1. A portable conveyer section comprising an elongated frame of flattened and inverted isosceles triangular shape in side elevation, a plurality of belt supporting rollers positioned transversely of the frame in two different planes thereon, pneumatic tire means, means journaling the tire means at the center bottom of the frame for rotation about a horizontal axis, means mounting the tire journaling means for rotation around a vertical axis, means for locking the last-named means against rotation around a vertical axis, a pair of gusset plates secured to one end of the frame and having extending portions adapted to be secured to the next adjacent conveyer section, said gusset plates each having one round bolt-attaching hole for the end of the next conveyer section and at least one arcuate slot thrown on a radius from the hole, and a pair of shoring up members adjustably carried by opposite sides of one end of the frame.

2. A portable conveyer section comprising an elongated frame of flattened and inverted isosceles triangular shape in side elevation, a plurality of belt supporting rollers positioned transversely of the frame in two different planes thereon, a pneumatic tire, means journaling the tire at the center bottom of the frame for rotation about a horizontal axis, means mounting the tire journaling means for rotation around a vertical axis, means for locking the last-named means against rotation around a vertical axis, a pair of gusset plates secured to one end of the frame and having extending portions adapted to be secured to the next adjacent conveyer section, and a pair of shoring up members adjustably carried by opposite sides of one end of the frame.

3. A portable conveyer section comprising an elongated frame of flattened and inverted isosceles triangular shape in side elevation, a plurality of belt supporting rollers positioned transversely of the frame in two different planes thereon, pneumatic tire means, means journaling the tire means at the center bottom of the frame for rotation about a horizontal axis, means mounting the tire journaling means for rotation around a vertical axis, a pair of gusset plates secured to one end of the frame and having extending portions adapted to be secured to the next adjacent conveyer section, and a pair of shoring up members adjustably carried by opposite sides of one end of the frame.

4. A portable conveyer section comprising an elongated frame, a plurality of belt supporting rollers positioned transversely of the frame in two different planes thereon, a pneumatic tire, means journaling the tire at the center bottom of the frame for rotation about a horizontal axis, means mounting the tire journaling means for rotation around a vertical axis, a pair of gusset plates secured to one end of the frame and having extending portions adapted to be secured to the next adjacent conveyer section, and a pair of shoring up members adjustably carried by opposite sides of one end of the frame.

5. A portable conveyer section comprising an elongated frame, a plurality of belt supporting rollers positioned transversely of the frame in two different planes thereon, pneumatic tire means, means journaling the tire means at the center bottom of the frame for rotation about a horizontal axis, means mounting the tire journaling means for rotation around a vertical axis, means for locking the last-named means against rotation around a vertical axis, means secured to one end of the frame and adapted to be secured to the next adjacent conveyer section, and a pair of shoring up members adjustably secured to opposite sides of one end of the frame.

6. A conveyer system comprising a plurality of sections secured together end to end by quickly releasable means, said means comprising a pair of gusset plates secured to one end of each section and having extending portions secured to the next adjacent conveyor section, said gusset plates each having one round bolt-attaching hole for the end of the next conveyer section and at least one arcuate slot thrown on a radius from the hole, each conveyer section including pneumatic tire means mounted on a caster-type mounting centrally and at the bottom of the section, adjustable shoring means carried by each conveyer section at one end adjacent the point of connection to the next adjacent section, and an endless conveyer belt extending over and supported by the plurality of conveyer sections.

EDWARD W. STEPHENS.